United States Patent
Joe et al.

(10) Patent No.: US 9,347,334 B2
(45) Date of Patent: May 24, 2016

(54) TURBINE BLADE TIP CLEARANCE CONTROL

(75) Inventors: Christopher R. Joe, Wethersfield, CT (US); Daniel A. Ward, Winsted, CT (US)

(73) Assignee: United Technologies Corporation, Hartford, CT (US)

( * ) Notice: Subject to any disclaimer, the term of this patent is extended or adjusted under 35 U.S.C. 154(b) by 832 days.

(21) Appl. No.: 13/635,421

(22) PCT Filed: Mar. 31, 2010

(86) PCT No.: PCT/US2010/029341
§ 371 (c)(1),
(2), (4) Date: Dec. 19, 2012

(87) PCT Pub. No.: WO2011/123106
PCT Pub. Date: Oct. 6, 2011

(65) Prior Publication Data
US 2013/0089408 A1   Apr. 11, 2013

(51) Int. Cl.
*F01D 11/24* (2006.01)
*F01D 25/12* (2006.01)
*F02C 7/18* (2006.01)

(52) U.S. Cl.
CPC ............... *F01D 25/12* (2013.01); *F01D 11/24* (2013.01); *F02C 7/18* (2013.01); *Y02T 50/671* (2013.01); *Y02T 50/675* (2013.01)

(58) Field of Classification Search
CPC ............ F01D 11/24; F01D 25/12; F02C 7/18
See application file for complete search history.

(56) References Cited

U.S. PATENT DOCUMENTS

| | | | |
|---|---|---|---|
| 3,527,063 A | 9/1970 | Horn | |
| 3,975,901 A * | 8/1976 | Hallinger et al. | 60/786 |
| 4,329,114 A * | 5/1982 | Johnston et al. | 415/145 |
| 4,708,588 A * | 11/1987 | Schwarz et al. | 415/115 |
| 4,805,398 A | 2/1989 | Jourdain et al. | |
| 5,351,732 A * | 10/1994 | Mills et al. | 415/175 |
| 6,641,363 B2 | 11/2003 | Barrett et al. | |
| 6,779,967 B2 * | 8/2004 | Friedl | F02C 7/12 415/116 |
| 8,757,508 B2 * | 6/2014 | Haasz et al. | 236/102 |
| 2013/0089408 A1 * | 4/2013 | Joe et al. | 415/116 |

OTHER PUBLICATIONS

International Search Report and Written Opinion dated Jul. 20, 2010.
International Preliminary Report on Patentability Oct. 2, 2010.

* cited by examiner

*Primary Examiner* — Ninh H Nguyen
*Assistant Examiner* — Christopher R Legendre
(74) *Attorney, Agent, or Firm* — Carlson, Gaskey & Olds, P.C.

(57) ABSTRACT

An aircraft engine for use in a low-bypass turbofan application has a high pressure turbine having a blade and an engine casing disposed about the blade. A shield is disposed around the casing adjacent to the blade to create an area between the shield and the casing. A gate selectively controls entry of cooling air into the area and may be closed if the engine is maneuvering and may be open if cruising.

24 Claims, 4 Drawing Sheets

TURBINE BLADE TIP CLEARANCE CONTROL

RELATED APPLICATION

This application claims priority to PCT/US2010/029341, filed on Mar. 31, 2010.

BACKGROUND

Aircraft gas turbine case cooling systems help the efficiency of gas turbine engines by lowering fuel consumption thereof. The systems distribute relatively cool air from an engine compressor to the casing surface of turbine cases causing the casing surface to shrink. Clearance between the case inner diameter and turbine blade tips shrinks to minimize the amount of air that escapes around the blade tip thereby increasing fuel savings to optimize the system.

Generally, during a cruise condition, compressor air is ducted to manifolds that surround the turbine cases. The manifolds direct the cooler air on a case surface causing case diameter to shrink, closing blade tip-to-case clearances.

However, at take off or during climbing, the cooling air is shut off causing the cases to grow in diameter. Clearances between the blade tips and the casing are increased and the system is not optimized but blade-to-case interactions are minimized

SUMMARY

According to an exemplary embodiment, a low bypass turbofan gas turbine engine, such as in a fighter jet application, has a high pressure turbine having a blade and an engine casing disposed about the blade. A shield is disposed around the casing adjacent to the blade to create an area between the shield and the casing. A gate selectively controls entry of cooling air into the area and may be closed if the engine is maneuvering and may be open if cruising.

According to a further exemplary embodiment, a cooling system is disposed in a low-bypass turbofan gas turbine engine, the engine having a high pressure turbine having a blade and an engine casing disposed about the blade. The cooling system has a shield disposed around the casing adjacent to the blade to create an area between the shield and the casing. A gate may selectively controls entry of fan air into the area if disposed about the casing such that the gate is adapted to be closed if the engine is maneuvering and may be open if the engine is cruising.

According to a further exemplary embodiment, a method of cooling a low-bypass turbofan engine includes the steps of providing a shield around a casing adjacent a high pressure turbine blade in the engine, gating fan air to an area between the shield and the casing to shrink the casing around the blades if the engine is in a cruise mode.

These and other features of the present invention can be best understood from the following specification and drawings, the following of which is a brief description.

DETAILED DESCRIPTION OF THE PREFERRED EMBODIMENT

Figure 1:
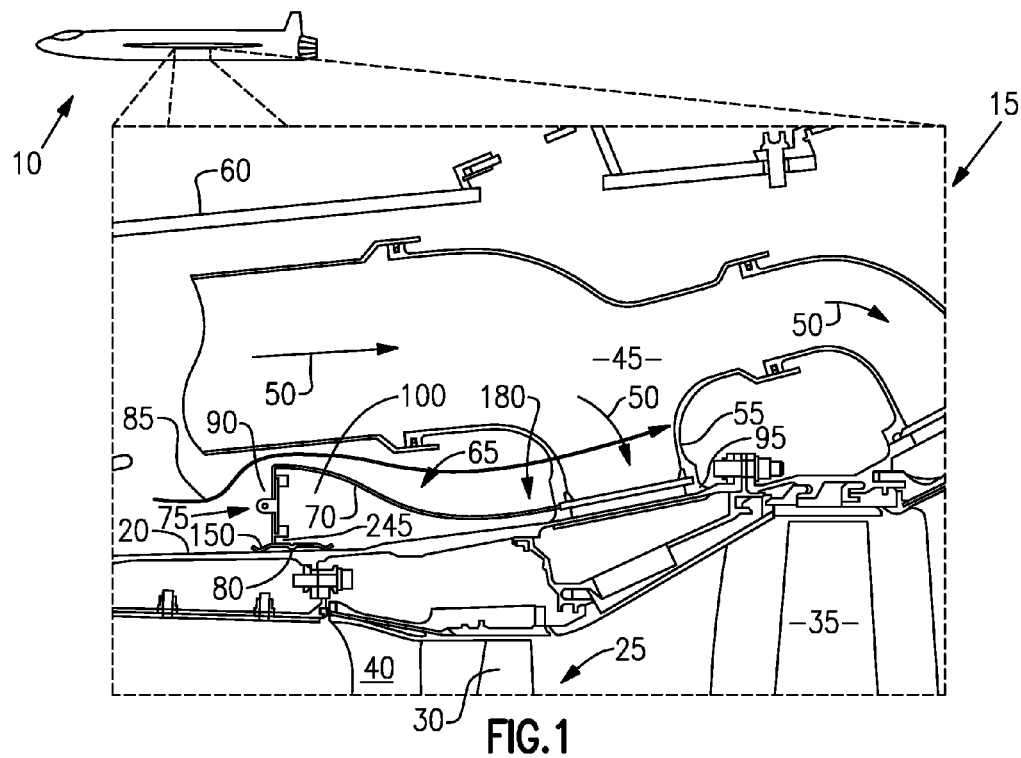
FIG. 1 shows a schematic drawing in which a jet engine utilizes a clearance control system that is off.

Referring to FIG. 1, a jet engine 15 used with aircraft that have performance as a priority, e.g., a military fighter aircraft 10 that is used for quick acceleration and deceleration, is schematically shown. Such engines 15 frequently employ high speed maneuvers, in which the engine may be throttled upwardly and downwardly quickly and often.

Historical active clearance control systems ("ACS" and not shown) do not work with these engines and aircraft 10. The cooling provided by an ACS cannot keep up with the rapid heat changes in the engine caused by maneuvering. For instance, a pilot (not shown) may need rapid acceleration in one instance that causes the case 20, and clearance, to expand rapidly. Air directed to the case by an ACS to minimize that clearance may not be delivered in time to cool the case during that maneuver. But cooling caused by the ACS may occur too rapidly as the throttle is pulled back to decelerate the aircraft (and the temperature of the engine) so that blade tip-to-case interference may occur. Such situations are clearly undesirable. Moreover, ACS may be heavy and may limit the aircraft's ability to maneuver. As a result, engines in this type of aircraft 10 do not have ACS and particularly in the high pressure turbine section 25 of the engine 15 where such tip-to-case in clearance is critical and in which tip-to-case interference is undesirable.

Figure 2:
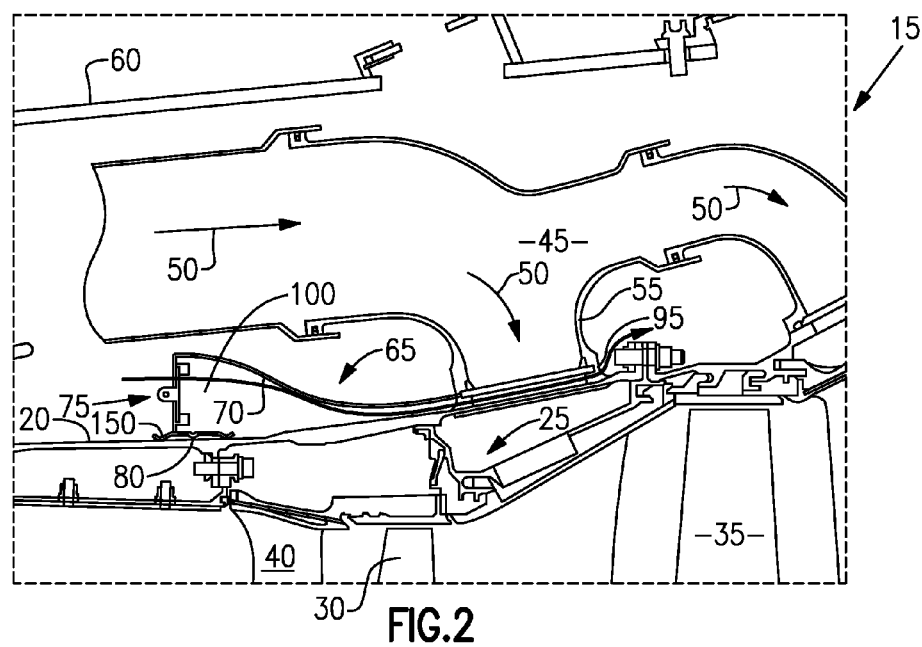
FIG. 2 is an embodiment of the schematic embodiment of the jet system of FIG. 1 in which the air flow is vented through the duct.

Referring to FIGS. 1 and 2, a portion 17 of an engine 15 is shown. The engine casing 20 encloses high pressure turbine blades 30, low pressure turbine blades 35 and a plurality of stationary struts 40. A ducting system 45 directs cooling air (indicated by arrows 50) on a continual basis to the case 20 outside the low pressure turbine blades 35 via boss 55. This cooling air is typically directed from a compressor (not shown) through the ducting system 45 in an area between the case 20 and a nacelle 60.

Referring now to FIGS. 1 and 2, exemplary clearance control system 65 ("CCS") for the high pressure turbine blades 30, or other areas of the engine 15, is shown. The CCS 65 includes a heat shield 70, an actuation valve 75, and a finger seal 80, or other means of conventionally constraining the heat shield to a cylindrical case, such as a band clamp (not shown). FIG. 1 shows the actuation valve 75 closed thereby causing a flow of cooling air 85 not to pass between the heat shield 70 and the case 20 thereby allowing the case to expand and minimize a probability of tip-to-case interference. Such a condition is used if said aircraft 10 is maneuvering. FIG. 2 shows the actuation valve 75 open thereby causing a flow of cooling air 85 from an engine fan (not shown) to pass between the heat shield 70 and the case 20 thereby causing the case 20 to shrink and improve fuel consumption. Such a condition is used if said aircraft 10 is cruising or in steady state as will be discussed herein.

Figure 3:
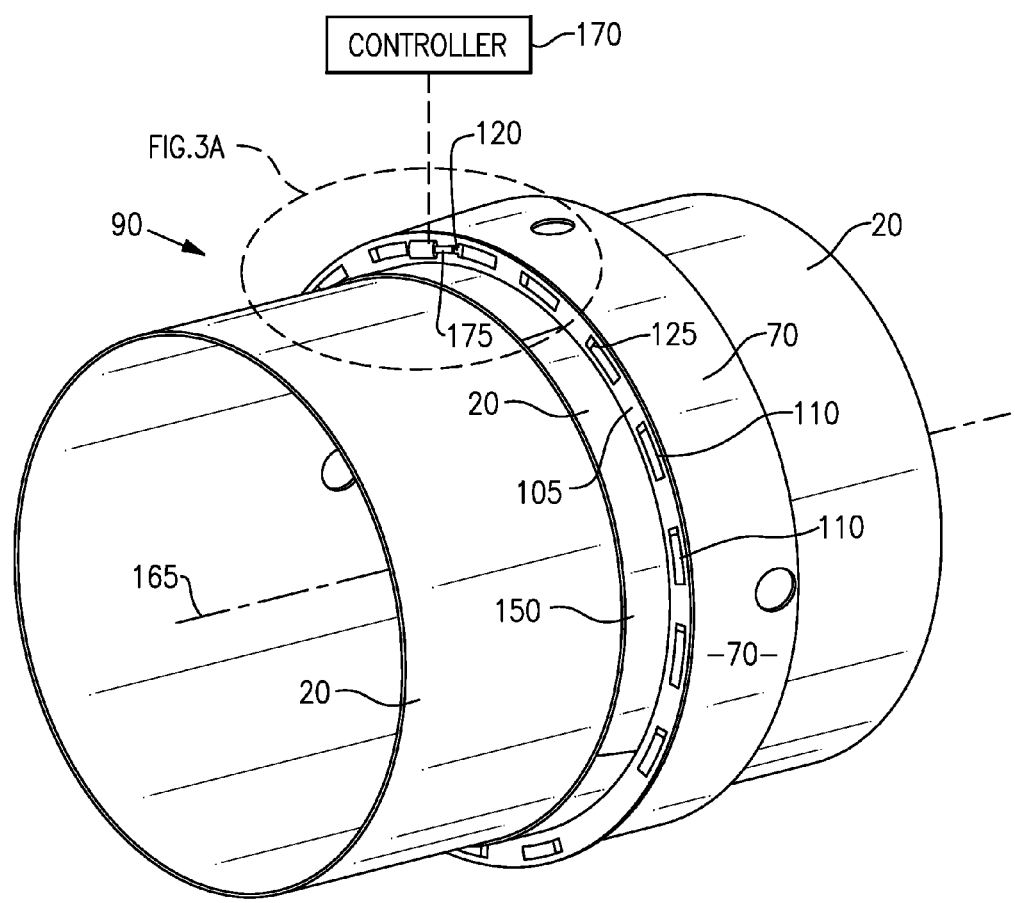
FIG. 3 shows a perspective view of the air cooling system of FIG. 1.
Figure 3A:
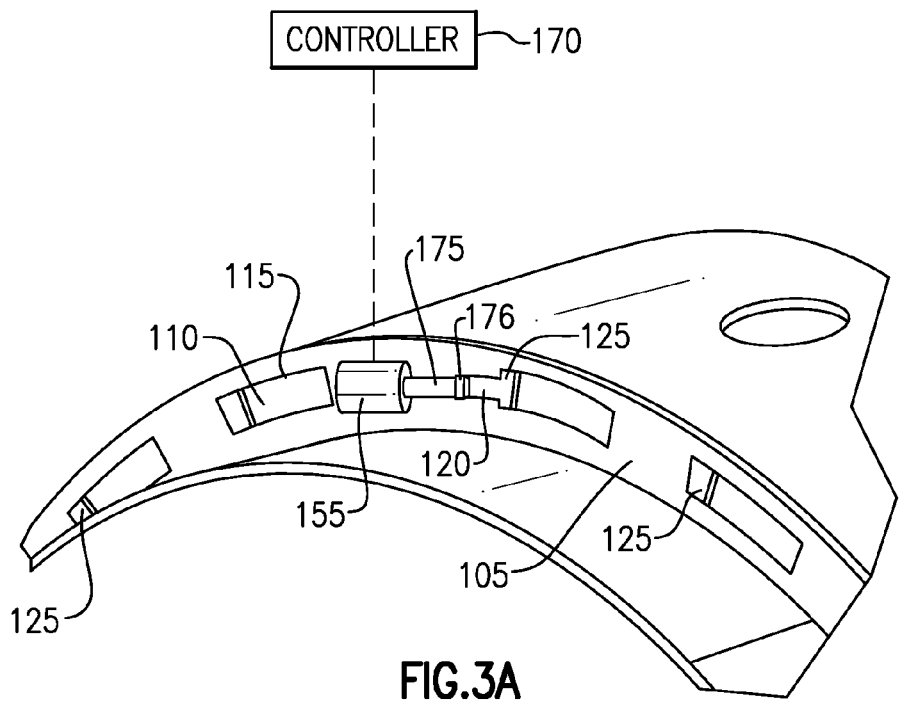
FIG. 3A shows an expanded view taken along the lines 3A in FIG. 3.
Figure 3B:
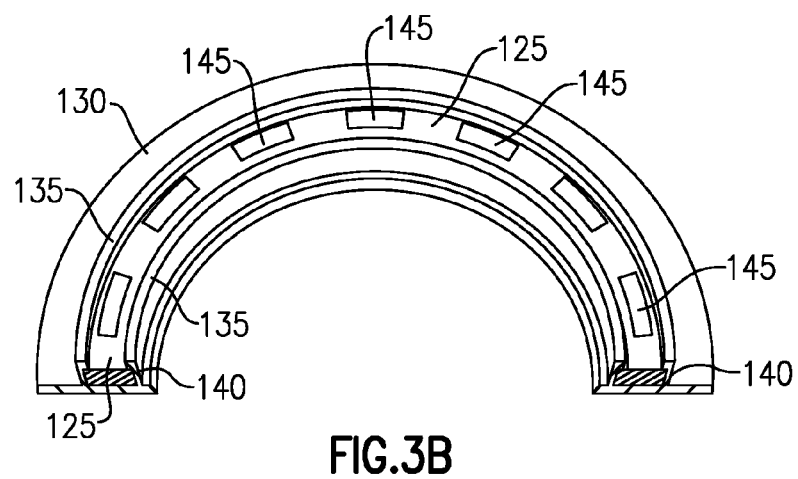
FIG. 3B shows a back view of FIG. 3A.
Figure 4:
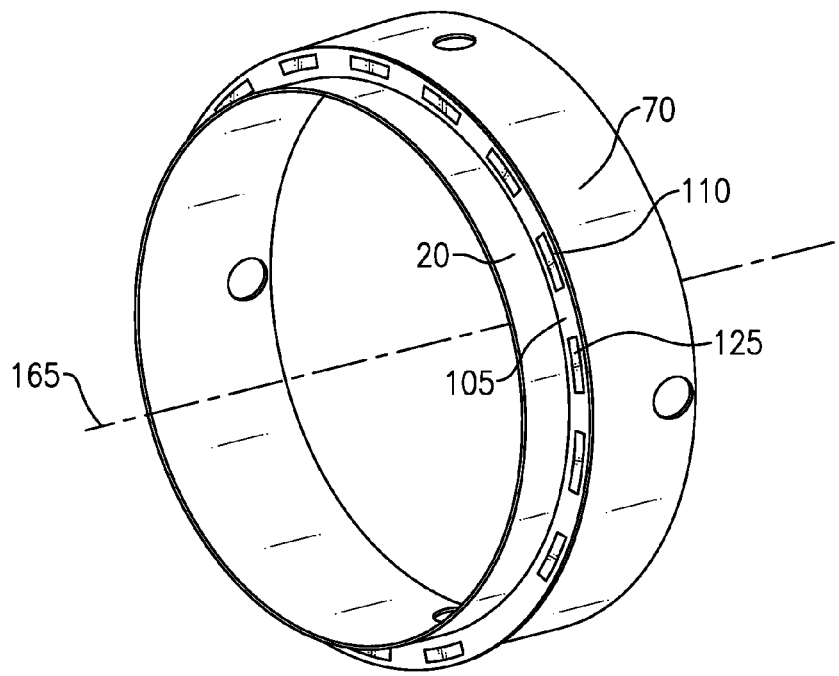
FIG. 4 shows a perspective view of the system disclosed herein in a closed condition.

Referring now also to FIGS. 3, 3A, and 3B, the heat shield 70 is a piece of annular sheet metal that is contoured radially from its inlet end 90 to its outlet end 95 a distance from the casing to allow a proper amount of air 85 into a space 100 between the heat shield 70 about the case 20 adjacent to the high pressure turbine blades 30.

The inlet end 90 has a vertically-oriented face 105 (though other orientations are contemplated herein) that has a plurality of openings 110 that are roughly rectangular having curved sides 115 as the heat shield 70 is designed to enclose the case 20. On that face 105, the heat shield 70 has one or more slots 120 for cooperating with an annular strap 125 as will be discussed herein. The strap 125 and the face 105 and its openings 110 form the valve (or gate) 75.

The face 105 on its back portion 130 (see FIG. 3B) thereof has annular L-shaped flanges 135 that form races 140 for holding the flat annular strap 125 against the back portion 130. The strap 125 has a plurality of spaced slots 145 that complement the shape of the openings 110 and are designed to be in register, partially in register and out of register with the openings 110 in the face 105 to meter air 85 in the space 100.

The heat shield 70 has a bottom flange 245 which is designed to be in register with the casing 20. A finger seal 150 (see FIGS. 1 and 2) is attached to the bottom flange 245 by conventional means and is disposed against the case 20 and against the flange 245 to prevent the air 85 from entering the area 100 closed by the heat shield if not desired. The finger seal 150 is one embodiment, and it should be apparent to those skilled in the art that the forward heat shield can be attached by other means, including a band clamp (not shown).

Referring to FIG. 3A, the face 105 of the heat shield may have an electro mechanical device 155 that engages a boss in the slot 120 to move the strap radially or about an axis 165 of the engine 15. This electromechanical device 155, such as a solenoid or the like) is attached to a controller 170, as will be discussed herein, via a rod 175 attaching to the tab 176 attached to the strap 125. The strap is placed within the races 140 within the back 130 of face 105 and is controlled by the electromechanical device 155 to move the strap 125 into and out of registry with the openings 110 in the face 105 of the heat shield 70. One may also recognize that the strap may be rotated by a remote linkage (not shown) or the like.

The heat shield 70 has several openings 180 therein to allow the boss 55 that extends from the duct system 50 to pass therethrough to provide a cooling air to the low pressure turbine blades 35 of the engine 15.

Referring now to FIGS. 1 and -3-4, the operation of the heat shield is described. If the air-craft is maneuvering, the strap 125 is rotated in its races 140 so that the slots 145 in the strap 125 do not align with the openings 110 in the face 105. Air 85 cannot enter the space 100 and the case 20 is not cooled. Clearance between the blade 30 and the case 20 is allowed to grow thereby minimizing a possibility of tip-to-case interference.

Referring now to FIGS. 3 and 3A, the operation of the heat shield 70 is described. If the aircraft 10 is in a steady state, e.g., where it is neither cruising nor maneuvering but cooling is somewhat effecting and maneuvering is possible, the strap 125 is rotated in its races 140 so that the slots 145 in the strap 125 align partially with the openings 110 in the face 105. Some air 85 enters the space 100 and the case 20 is cooled a degree. Clearance between the blade 30 and the case 20 is being controlled to a degree thereby starting to minimize fuel consumption.

Figure 5:
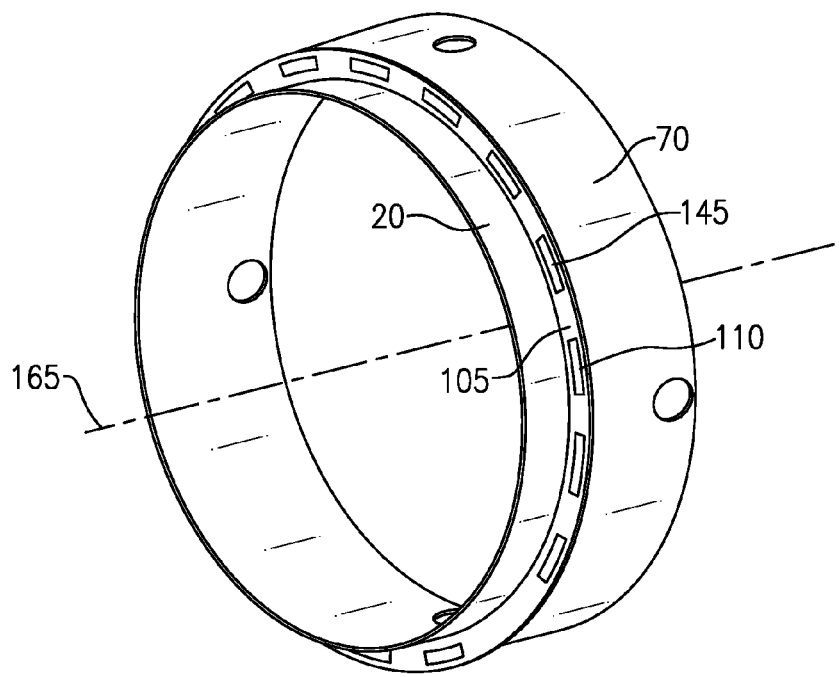
FIG. 5 shows the system disclosed herein in an opened condition.

Referring now to FIGS. 2-3 and 5, the operation of the heat shield is described. If the air craft is cruising, e.g., where maneuvering is not anticipated, the strap 125 is rotated in its races 140 so that the slots 145 in the strap 125 align with the openings 110 in the face 105. Air 85 enters the space 100 and the case 20 is cooled to minimize tip clearance and to minimize fuel consumption.

This simple, light-weight CCS may provide a fuel efficiency benefit, in the range of 0.5%-1.0% TSFC (thrust specific fuel consumption).

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An aircraft engine for use in a fighter jet, said aircraft engine comprising:
a high pressure turbine having a blade,
an engine casing disposed about said blade,
a shield disposed around said casing adjacent to said blade and creating an area between said shield and said casing,
a gate disposed along said shield, said gate rotatable about said engine casing for selectively controlling entry of cooling air into said area, wherein said gate is closed when said engine is maneuvering, and wherein said gate is open when said engine is cruising.

2. The aircraft engine of claim 1 wherein said gate is partially open when said engine is being operated in a steady state.

3. The aircraft engine of claim 1 wherein said gate is built into a front of said shield.

4. The aircraft engine of claim 1 wherein said shield defines an opening, said gate comprises a strap having a slot, said strap being movable relative to said opening such that said slot and said opening may be in register with each other.

5. The aircraft engine of claim 4 wherein said opening is disposed in a face of said shield, said face extending in a radial direction relative to an axis of said high pressure turbine.

6. The aircraft engine of claim 5 wherein said face has a race therein for holding said strap.

7. The aircraft engine of claim 6 wherein said strap is moveable within said race for moving said slot of said strap into and out of register with said opening.

8. The aircraft engine of claim 5, wherein an outer wall of said shield slopes radially inward from said face relative to said axis.

9. The aircraft engine of claim 5, wherein said strap is moveable about said axis.

10. The aircraft engine of claim 5, wherein said opening is a plurality of openings circumferentially distributed about said face, and said slot is a plurality of slots circumferentially distributed about said strap, each of said plurality of slots corresponding to one of said plurality of openings.

11. The aircraft engine of claim 4 wherein said shield and said strap form an annulus.

12. The aircraft engine of claim 4, wherein said shield defines a duct opening configured to receive a boss, said boss defining a passage configured to communicate cooling airflow to said high pressure turbine, said boss fluidly separating said passage and said area.

13. The aircraft engine of claim 1 wherein said cooling air is fan air.

14. The aircraft engine of claim 1, comprising a controller coupled to an actuator, said actuator configured to selectively move said gate relative to said shield.

15. A cooling system for an aircraft engine for use in a fighter jet, the aircraft engine having a high pressure turbine having a blade and an engine casing disposed about said blade, said cooling system comprising:
   a shield disposed around said casing adjacent to said blade and for creating an area between said shield and said casing; and
   a gate disposed along said shield, said gate rotatable about said engine casing for selectively controlling entry of cooling air into said area, said gate disposed about said casing, wherein said gate is adapted to be closed if said engine is maneuvering, and wherein said gate is open when said engine is cruising.

16. The cooling system of claim 15 wherein said gate is adapted to be partially open when said engine is being operated in a steady state.

17. The cooling system of claim 15 wherein said gate is built into a front of said shield.

18. The cooling system of claim 15 wherein said shield defines an opening, said gate comprises an opening and a strap having a slot, said strap being movable relative to said opening such that said slot and said opening are in register with each other.

19. The cooling system of claim 18 wherein said opening is disposed in front of said shield.

20. The cooling system of claim 18 wherein said face has a race therein for holding said strap.

21. The cooling system of claim 20 wherein said strap is moveable within said race for moving said slot of said strap into and out of register with said opening.

22. A method of cooling an engine used in a fighter jet comprising:
   providing a shield around a casing adjacent to a high pressure turbine blade in said engine, said shield including a radially extending face;
   providing a gate adjacent to said face; and
   moving said gate about said engine casing such that cooling air is delivered to an area between said shield and said casing to shrink said casing around said blade when said engine is in a cruise mode.

23. The method of claim 22 further comprising:
   moving said gate to partially block cooling air from entering said area when said engine is in a steady state mode.

24. The method of claim 23 further comprising:
   moving said gate to fully block cooling air from entering said area when said engine is in a maneuvering mode.

* * * * *